(12) United States Patent
Maksai et al.

(10) Patent No.: US 12,008,692 B2
(45) Date of Patent: Jun. 11, 2024

(54) SYSTEMS AND METHODS FOR DIGITAL INK GENERATION AND EDITING

(71) Applicant: Google LLC, Mountain View, CA (US)

(72) Inventors: Andrii Maksai, Zurich (CH); Henry Rowley, Cupertino, CA (US); Jesse Berent, Geneva (CH); Claudiu Musat, Vaud (CH)

(73) Assignee: Google LLC, Mountain View, CA (US)

( * ) Notice: Subject to any disclaimer, the term of this patent is extended or adjusted under 35 U.S.C. 154(b) by 71 days.

(21) Appl. No.: 17/831,623

(22) Filed: Jun. 3, 2022

(65) Prior Publication Data

US 2023/0394720 A1    Dec. 7, 2023

(51) Int. Cl.
*G06T 11/20*    (2006.01)
*G06V 30/19*    (2022.01)
*G06V 30/32*    (2022.01)

(52) U.S. Cl.
CPC ...... *G06T 11/203* (2013.01); *G06V 30/19147* (2022.01); *G06V 30/347* (2022.01)

(58) Field of Classification Search
CPC ............ G06V 30/347; G06V 30/19147; G06T 11/203
See application file for complete search history.

(56) References Cited

U.S. PATENT DOCUMENTS

| | | | |
|---|---|---|---|
| 2020/0167596 A1* | 5/2020 | Yang | G06T 5/70 |
| 2021/0166013 A1* | 6/2021 | Tensmeyer | G06N 3/08 |
| 2022/0148245 A1* | 5/2022 | Szarzynski | G06F 40/109 |
| 2023/0139831 A1* | 5/2023 | Wang | G06V 30/1444 704/9 |
| 2023/0316792 A1* | 10/2023 | Hu | G06V 30/19147 |

OTHER PUBLICATIONS

A. Vaswani, et al. Attention Is All You Need. In Advances in Neural Information Processing Systems, 2017. 11 Pages.

T. Unterthiner, et al. Towards Accurate Generative Models of Video: A New Metric & Challenges. arXiv:1812.01717v1, Dec. 3, 2018. 16 Pages.

T. Unterthiner, et al. Towards Accurate Generative Models of Video: A New Metric & Challenges. arXiv:1812.01717v2, Mar. 27, 2019. 17 Pages.

(Continued)

*Primary Examiner* — Phi Hoang
(74) *Attorney, Agent, or Firm* — Botos Churchill IP Law

(57) ABSTRACT

Systems and methods for editing and generating digital ink. The present technology may provide systems and methods for training a handwriting model to generate digital ink that is stylistically and visually consistent with an original handwriting input, but which incorporates one or more changes to the text of the original handwriting input. In some examples, training may be performed using training examples that include an original handwriting sample and an original label representing the sequence of characters in the original handwriting sample. In such a case, the original handwriting sample may be processed to generate a style vector that is randomly masked, and the handwriting model may then be trained to generate a predicted handwriting sample that closely matches the original handwriting sample using the masked style vector and the original label as inputs.

24 Claims, 9 Drawing Sheets

(56) References Cited

OTHER PUBLICATIONS

A. Das, et al. Beziersketch: A generative model for scalable vector sketches. arXiv:2007.02190v1, Jul. 4, 2020. 20 Pages.
A. Das, et al. Beziersketch: A generative model for scalable vector sketches. arXiv:2007.02190v2, Jul. 14, 2020. 19 Pages.
A. Das, et al. Cloud2curve: Generation and vectorization of parametric sketches. In Proceedings of the IEEE/CVF Conference on Computer Vision and Pattern Recognition, 2021. pp. 7088-7097.
A. Graves. Generating sequences with recurrent neural networks. arXiv:1308.0850v1, Aug. 4, 2013. 43 Pages.
A. Graves. Generating sequences with recurrent neural networks. arXiv:1308.0850v2, Aug. 11, 2013. 43 Pages.
A. Graves. Generating sequences with recurrent neural networks. arXiv:1308.0850v3, Feb. 21, 2014. 43 Pages.
A. Graves. Generating sequences with recurrent neural networks. arXiv:1308.0850v4, Apr. 2, 2014. 43 Pages.
A. Graves. Generating sequences with recurrent neural networks. arXiv:1308.0850v5, Jun. 5, 2014. 43 Pages.
A. Kotani, et al. Generating handwriting via decoupled style descriptors. arXiv:2008.11354v1, Aug. 26, 2020. 35 Pages.
A. Kotani, et al. Generating handwriting via decoupled style descriptors. arXiv:2008.11354v2, Sep. 14, 2020. 35 Pages.
A. Maksai, et al. Inkorrect: Digital Ink Spelling Correction. Version under review as a conference paper at ICLR 2022. Downloaded on Mar. 31, 2022 from https://openreview.net/pdf?id=BSIInh4uDZq. 5 Pages.
C. Lin. Rouge: A Package for Automatic Evaluation of Summaries. In Text Summarization Branches Out, Barcelona, Spain. Association for Computational Linguistics. 2004. pp. 74-81.
C. Musat, et al. Improving Topic Evaluation Using Conceptual Knowledge. In Twenty-Second International Joint Conference on Artificial Intelligence, 2011. pp. 1866-1871.
D. Ha, et al. A neural representation of sketch drawings. arXiv:1704.03477v1, Apr. 11, 2017. 20 Pages.
D. Ha, et al. A neural representation of sketch drawings. arXiv:1704.03477v2, Apr. 16, 2017. 20 Pages.
D. Ha, et al. A neural representation of sketch drawings. arXiv:1704.03477v3, May 18, 2017. 15 Pages.
D. Ha, et al. A neural representation of sketch drawings. arXiv:1704.03477v4, May 19, 2017. 15 Pages.
D. Kingma, et al. A method for stochastic optimization. arXiv:1412.6980v1, Dec. 22, 2014. 9 Pages.
D. Kingma, et al. A method for stochastic optimization. arXiv:1412.6980v2, Jan. 17, 2015. 13 Pages.
D. Kingma, et al. A method for stochastic optimization. arXiv:1412.6980v3, Feb. 27, 2015. 13 Pages.
D. Kingma, et al. A method for stochastic optimization. arXiv:1412.6980v4, Mar. 3, 2015. 13 Pages.
D. Kingma, et al. A method for stochastic optimization. arXiv:1412.6980v5, Apr. 23, 2015. 13 Pages.
D. Kingma, et al. A method for stochastic optimization. arXiv:1412.6980v6, Jun. 23, 2015. 15 Pages.
D. Kingma, et al. A method for stochastic optimization. arXiv:1412.6980v7, Jul. 20, 2015. 13 Pages.
D. Kingma, et al. A method for stochastic optimization. arXiv:1412.6980v8, Jul. 23, 2015. 15 Pages.
D. Kingma, et al. A method for stochastic optimization. arXiv:1412.6980v9, Jan. 30, 2017. 15 Pages.
E. Aksan et al. CoSE: Compositional stroke embeddings. arXiv:2006.09930v2, Nov. 30, 2020. 19 Pages.
E. Aksan, et al. CoSE: Compositional stroke embeddings. arXiv:2006.09930v1, Jun. 17, 2020. 17 Pages.
E. Aksan, et al. Deepwriting: Making digital ink editable via deep generative modeling. In Proceedings of the 2018 CHI Conference on Human Factors in Computing Systems, 2018. 15 pages.
H. Nguyen, et al. A database of unconstrained Vietnamese online handwriting and recognition experiments by recurrent neural networks. Pattern Recognition, 2018. pp. 291-306.
J. Chang, et al. Style equalization: Unsupervised learning of controllable generative sequence models. arXiv:2110.02891v1, Oct. 6, 2021. 18 Pages.
J. Chung, et al. A recurrent latent variable model for sequential data. Advances in neural information processing systems, 2015. 9 Pages.
J. Lau, et al. Machine reading tea leaves: Automatically evaluating topic coherence and topic model quality. In Proceedings of the 14th Conference of the European Chapter of the Association for Computational Linguistics, 2014. pp. 530-539.
J. Song, et al. Learning to Sketch with Shortcut Cycle Consistency. In Proceedings of the IEEE conference on computer vision and pattern recognition, 2018. 10 Pages.
K. Arun, et al. Least-squares fitting of two 3-d point sets. IEEE Transactions on pattern analysis and machine intelligence, 1987. pp. 698-700.
K. Kilgour, et al. Frechet audio distance: A reference-free metric for evaluating music enhancement algorithms. In Interspeech, 2019. pp. 2350-2354.
L. Ribeiro, et al. Sketchformer: Transformer-based Representation for Sketched Structure. In Proceedings of the IEEE/CVF Conference on Computer Vision and Pattern Recognition, 2020. pp. 14153-14162.
L. Theis, et al. A note on the evaluation of generative models. arXiv:1511.01844v1, Nov. 5, 2015. 9 Pages.
L. Theis, et al. A note on the evaluation of generative models. arXiv:1511.01844v2, Jan. 6, 2016. 10 Pages.
L. Theis, et al. A note on the evaluation of generative models. arXiv:1511.01844v3, Apr. 24, 2016. 10 Pages.
M. Heusel, et al. GANs trained by a two time-scale update rule converge to a local nash equilibrium. Advances in heural information processing systems, 2017. 12 Pages.
M. Liwicki, et al. IAM-OnDB—an on-line English Sentence Database Acquired from Handwritten Text on a Whiteboard. In ICDAR'05. IEEE, 2005. 6 Pages.
N. Cao, et al. In Proceedings of the AAAI Conference on Artificial Intelligence, 2019. pp. 2564-2571.
OpenReview Comments regarding A. Maksai, et al., Inkorrect: Digital Ink Spelling Correction, submitted for ICLR 2022 DGM4HSD workshop. Printed Mar. 31, 2022 from https://openreview.net/forum?id=BSIInh4uDZq. 3 Pages.
RJ Skerry-Ryan, et al. Towards End-to-End Prosody Transfer for Expressive Speech Synthesis with Tacotron. In ICML'18, 2018. 10 Pages.
S. Hochreiter et al. Long short-term memory. Neural computation, 1997. 32 Pages.
S. Kolouri, et al. Sliced-wasserstein autoencoder: An embarrassingly simple generative model. arXiv:1804.01947v1, Apr. 5, 2018. 25 Pages.
S. Kolouri, et al. Sliced-wasserstein autoencoder: An embarrassingly simple generative model. arXiv:1804.01947v2, Jun. 14, 2018. 25 Pages.
S. Kolouri, et al. Sliced-wasserstein autoencoder: An embarrassingly simple generative model. arXiv:1804.01947v3, Jun. 27, 2018. 25 Pages.

* cited by examiner

802

Process the original handwriting sample to generate a style vector having a plurality of elements, the original handwriting sample representing a first sequence of characters

804

Modify a predetermined portion of the plurality of elements of the style vector to generate a masked style vector

806

Generate, using the handwriting model, a modified handwriting sample based on at least the masked style vector and a modified label, the modified label indicating a second sequence of characters, the second sequence of characters differing from the first sequence of characters by at least one character

Generate, based on at least a masked style vector (e.g., that of step 706 of FIG. 7 or step 802 of FIG. 8) and a label (e.g., the original label of FIG. 7 or the modified label FIG. 8):
- a first location prediction indicating one or more predicted locations of a first point of the handwriting sample,
- a first end-of-stroke prediction representing whether the first point is predicted to be an end of a stroke within the handwriting sample, and
- a first end-of-sample prediction representing whether the first point is predicted to be a last point of the handwriting sample

904

Generate, based on at least the masked style vector, the label, the first location prediction, the first end-of-stroke prediction, and the first end-of-sample prediction:
- a second location prediction indicating one or more predicted locations of a next point of the handwriting sample,
- a second end-of-stroke prediction representing whether the next point is predicted to be an end of a stroke within the handwriting sample, and
- a second end-of-sample prediction representing whether the next point is predicted to be a last point of the handwriting sample

906 Is the "next point" of step 904 the last point?

No → 908 Set the second location prediction to be the first location prediction

910 Set the second end-of-stroke prediction to be the first end-of-stroke prediction

912 Set the second end-of-sample prediction to be the first end-of-sample prediction Yes → 914 End

SYSTEMS AND METHODS FOR DIGITAL INK GENERATION AND EDITING

BACKGROUND

Electronic devices may be configured to allow a user to enter text or other information by making handwriting motions with their finger, a stylus, a mouse, or some other input device. For example, some personal computers, tablets, and smart phones are equipped with touch screens or touch sensors that allow a user to write on an input surface with their finger or a stylus, and to see their inputs represented on an associated screen, in much the same way that the user might otherwise write on a piece of paper with a pen or pencil. However, while a user may choose to enter text in this way rather than through a keyboard, various challenges arise when editing and generating replacement text. For example, it may be difficult to implement changes to the handwriting in such a way that it remains visually consistent with the user's original handwritten input, such as may be desirable when implementing a user's edits, suggested autocomplete options, or suggested spelling or grammatical corrections.

BRIEF SUMMARY

The present technology concerns systems and methods for editing and generating digital ink (e.g., a digitized version of handwriting that was generated by a person, or a "handwriting" sample that is generated by a handwriting model but appears to have been written by a person's hand). For example, in some cases, a device may be configured to accept handwriting inputs from a user, and may be further configured to process the handwriting, convert it to text, and make suggestions based on the text (e.g., to notify the user of potential spelling errors, to suggest spelling or grammatical corrections, to suggest text to complete a word or sentence, etc.). Likewise, in some cases, a device may be configured to allow a user to indicate changes to be made to the original handwriting, such as by making editing notations to the original handwriting (e.g., cross-outs to indicate text to be deleted, "carrots" to indicate text to be inserted, etc.). In such cases, it may be desirable for the device to further include a handwriting model capable of generating new digital ink that incorporates these changes, while otherwise remaining visually consistent with the original handwriting input.

Thus, in some aspects, the present technology may provide systems and methods for training a handwriting model to generate digital ink that is stylistically and/or visually consistent with the user's original handwriting input, but which incorporates one or more changes to the text of the original handwriting input. For example, a handwriting model may be trained using training examples that each include an original handwriting sample and an original label representing the sequence of characters in the original handwriting sample. In such a case, the original handwriting sample may be processed to generate a style vector that is randomly masked, and the handwriting model may then be trained to generate a predicted handwriting sample that closely matches the original handwriting sample using only the masked style vector and the original label as inputs. Likewise, through such training, the present technology may be used to generate a handwriting model capable of performing inference based solely on an original handwriting sample and a modified label representing a modified sequence of characters (e.g., a spell-corrected, grammar-corrected, or autocompleted version of the sequence of characters represented in the original handwriting sample), such that the handwriting model will output a modified handwriting sample that represents the modified sequence of characters while remaining similar in overall appearance and/or style to the original handwriting sample. In this way, the present technology may enable a handwriting model to be efficiently trained to generate modified versions of handwriting samples based on training data that can be easily generated (e.g., by automatically generating labels from existing handwriting samples using a handwriting recognition model), that does not need to be from the same writer, and that does not require accompanying character segmentation data indicating where each character exists within each handwriting sample.

In one aspect, the disclosure describes a computer-implemented method, comprising training a handwriting model, wherein the training comprises: (1) for each given training example of a plurality of training examples, the given training example including an original handwriting sample representing a sequence of characters and an original label indicating a sequence of characters represented in the original handwriting sample: processing, using the handwriting model, the original handwriting sample to generate a style vector having a plurality of elements; modifying, using one or more processors of a processing system, a random selection of one or more of the plurality of elements of the style vector to generate a masked style vector; generating, using the handwriting model, a predicted handwriting sample based on at least the masked style vector and the original label; and comparing, using the one or more processors, the predicted handwriting sample to the original handwriting sample to generate a loss value for the given training example; and (2) modifying, using the one or more processors, one or more parameters of the handwriting model based at least in part on the loss values generated for each of the plurality of training examples. In some aspects, the original handwriting sample comprises a digital image. In some aspects, the original handwriting sample comprises a plurality of spatial coordinates. In some aspects, each given spatial coordinate of the plurality of spatial coordinates comprises a two-dimensional point. In some aspects, each given spatial coordinate of the plurality of spatial coordinates is associated with a time value. In some aspects, each given spatial coordinate of the plurality of spatial coordinates comprises a one-dimensional coordinate for the time value. In some aspects, the time value associated with each given spatial coordinate is an absolute time value. In some aspects, the time value associated with each given spatial coordinate is a relative time value. In some aspects, the relative time value associated with each given spatial coordinate is a sequence identifier indicating a temporal order of each given spatial coordinate. In some aspects, the original handwriting sample comprises a plurality of parametric curves. In some aspects, the one or more processors use the handwriting model to modify the random selection of one or more of the plurality of elements of the style vector to generate the masked style vector. In some aspects, modifying the random selection of one or more of the plurality of elements of the style vector to generate the masked style vector comprises deleting a random selection of one or more of the plurality of elements from the style vector to generate the masked style vector. In some aspects, modifying random selection of one or more of the plurality of elements of the style vector to generate the masked style vector comprises assigning a predetermined value to random selection of one or more of the plurality of elements of the style vector to generate the masked style vector. In some aspects, the predetermined value is zero. In some aspects, generating the predicted handwriting sample based on at least the masked style vector and the original label comprises: (1) generating, based on at least the masked style vector and the original label: a first location prediction indicating one or more predicted locations of a first point of the predicted handwriting sample; a first end-of-stroke prediction representing whether the first point is predicted to be an end of a stroke within the predicted handwriting sample; and a first end-of-sample prediction representing whether the first point is predicted to be a last point of the predicted handwriting sample; and (2) generating, based on at least the masked style vector, the original label, the first location prediction, the first end-of-stroke prediction, and the first end-of-sample prediction: a second location prediction indicating one or more predicted locations of a second point of the predicted handwriting sample; a second end-of-stroke prediction representing whether the second point is predicted to be an end of a stroke within the predicted handwriting sample; and a second end-of-sample prediction representing whether the first point is predicted to be a last point of the predicted handwriting sample. In some aspects, the first location prediction comprises a first probability distribution associating a probability value with each of the one or more predicted locations of the first point, and the second location prediction comprises a second probability distribution associating a probability value with each of the one or more predicted locations of the second point. In some aspects, the first location prediction comprises a probability distribution associating a probability value with one or more parameters of a parametric curve ending at the first point, and the second location prediction comprises a probability distribution associating a probability value with one or more parameters of a parametric curve ending at the second point.

In another aspect, the disclosure describes a computer program product comprising computer readable instructions that, when executed by a processing system, cause the processing system to perform any of the methods described in the preceding paragraph. Likewise, in another aspect, the disclosure describes a processing system comprising one or more processors configured to carry out any of the methods described above.

In another aspect, the disclosure describes a processing system comprising: (1) a memory storing a handwriting model; and (2) one or more processors coupled to the memory and configured to train the handwriting model according to a training method comprising: (a) for each given training example of a plurality of training examples, the given training example including an original handwriting sample representing a sequence of characters and an original label indicating a sequence of characters represented in the original handwriting sample: processing, using the handwriting model, the original handwriting sample to generate a style vector having a plurality of elements; modifying a random selection of one or more of the plurality of elements of the style vector to generate a masked style vector; generating, using the handwriting model, a predicted handwriting sample based on at least the masked style vector and the original label; and comparing the predicted handwriting sample to the original handwriting sample to generate a loss value for the given training example; and (b) modifying one or more parameters of the handwriting model based at least in part on the loss values generated for each of the plurality of training examples. In some aspects, the one or more processors are further configured to use the handwriting model to modify the random selection of one or more of the plurality of elements of the style vector to generate the masked style vector. In some aspects, the one or more processors are configured to modify the random selection of one or more of the plurality of elements of the style vector to generate the masked style vector by deleting the random selection of one or more of the plurality of elements of the style vector to generate the masked style vector. In some aspects, the one or more processors are configured to modify the random selection of one or more of the plurality of elements of the style vector to generate the masked style vector by assigning a predetermined value to the random selection of one or more of the plurality of elements of the style vector to generate the masked style vector. In some aspects, the one or more processors being configured to generate the predicted handwriting sample based on at least the masked style vector and the original label comprises using the handwriting model to: (1) generate, based on at least the masked style vector and the original label: a first location prediction indicating one or more predicted locations of a first point of the predicted handwriting sample; a first end-of-stroke prediction representing whether the first point is predicted to be an end of a stroke within the predicted handwriting sample; and a first end-of-sample prediction representing whether the first point is predicted to be a last point of the predicted handwriting sample; and (2) generate, based on at least the masked style vector, the original label, the first location prediction, the first end-of-stroke prediction, and the first end-of-sample prediction: a second location prediction indicating one or more predicted locations of a second point of the predicted handwriting sample; a second end-of-stroke prediction representing whether the second point is predicted to be an end of a stroke within the predicted handwriting sample; and a second end-of-sample prediction representing whether the first point is predicted to be a last point of the predicted handwriting sample.

In another aspect, the disclosure describes a computer-implemented method, comprising: processing, using a handwriting model, an original handwriting sample to generate a style vector having a plurality of elements, the original handwriting sample representing a first sequence of characters; modifying, using one or more processors of a processing system, a predetermined portion of the plurality of elements of the style vector to generate a masked style vector; and generating, using the handwriting model, a modified handwriting sample based on at least the masked style vector and a modified label, the modified label indicating a second sequence of characters, the second sequence of characters differing from the first sequence of characters by at least one character. In some aspects, the handwriting model is a handwriting model trained according to one of the training methods set forth in the preceding paragraphs. In some aspects, the method further comprises: generating, using the one or more processors, the second sequence of characters based on the first sequence of characters. In some aspects, the second sequence of characters is a spell-corrected version of the first sequence of characters. In some aspects, the original handwriting sample comprises a digital image. In some aspects, the original handwriting sample comprises a plurality of spatial coordinates. In some aspects, each given spatial coordinate of the plurality of spatial coordinates comprises a two-dimensional point. In some aspects, each given spatial coordinate of the plurality of spatial coordinates is associated with a time value. In some aspects, each given spatial coordinate of the plurality of spatial coordinates comprises a one-dimensional coordinate for the time value. In some aspects, the time value associated with each given spatial coordinate is an absolute time value. In some aspects, the time value associated with each given spatial coordinate is a relative time value. In some aspects, the relative time value associated with each given spatial coordinate is a sequence identifier indicating a temporal order of each given spatial coordinate. In some aspects, the original handwriting sample comprises a plurality of parametric curves. In some aspects, the one or more processors use the handwriting model to modify the predetermined portion of the plurality of elements of the style vector to generate the masked style vector. In some aspects, modifying the predetermined portion of the plurality of elements of the style vector to generate the masked style vector comprises deleting a predetermined selection of one or more of the plurality of elements of the style vector to generate the masked style vector. In some aspects, modifying the predetermined portion of the plurality of elements of the style vector to generate the masked style vector comprises assigning a predetermined value to a predetermined selection of one or more of the plurality of elements of the style vector to generate the masked style vector. In some aspects, the predetermined value is zero. In some aspects, generating the modified handwriting sample based on at least the masked style vector and the modified label comprises: (1) generating, based on at least the masked style vector and the modified label: a first location prediction indicating one or more predicted locations of a first point of the modified handwriting sample; a first end-of-stroke prediction representing whether the first point is predicted to be an end of a stroke within the modified handwriting sample; and a first end-of-sample prediction representing whether the first point is predicted to be a last point of the modified handwriting sample; and (2) generating, based on at least the masked style vector, the modified label, the first location prediction, the first end-of-stroke prediction, and the first end-of-sample prediction: a second location prediction indicating one or more predicted locations of a second point of the modified handwriting sample; a second end-of-stroke prediction representing whether the second point is predicted to be an end of a stroke within the modified handwriting sample; and a second end-of-sample prediction representing whether the first point is predicted to be a last point of the modified handwriting sample. In some aspects, the first location prediction comprises a first probability distribution associating a probability value with each of the one or more predicted locations of the first point, and the second location prediction comprises a second probability distribution associating a probability value with each of the one or more predicted locations of the second point. In some aspects, the first location prediction comprises a probability distribution associating a probability value with one or more parameters of a parametric curve ending at the first point, and the second location prediction comprises a probability distribution associating a probability value with one or more parameters of a parametric curve ending at the second point.

In another aspect, the disclosure describes a computer program product comprising computer readable instructions that, when executed by a processing system, cause the processing system to perform any of the methods described in the preceding paragraph. Likewise, in another aspect, the disclosure describes a processing system comprising one or more processors configured to carry out any of the methods described above.

In another aspect, the disclosure describes a processing system comprising: (1) a memory storing a handwriting model; and (2) one or more processors coupled to the memory and configured to: process, using the handwriting model, an original handwriting sample to generate a style vector having a plurality of elements, the original handwriting sample representing a first sequence of characters; modify a predetermined portion of the plurality of elements of the style vector to generate a masked style vector; and generate, using the handwriting model, a modified handwriting sample based on at least the masked style vector and a modified label, the modified label indicating a second sequence of characters, the second sequence of characters differing from the first sequence of characters by at least one character. In some aspects, the handwriting model is a handwriting model trained according to one of the training methods set forth in the preceding paragraphs. In some aspects, the method further comprises: generating, using the one or more processors, the second sequence of characters based on the first sequence of characters. In some aspects, the one or more processors are further configured to: generate the second sequence of characters based on the first sequence of characters. In some aspects, the one or more processors are further configured to: generate the second sequence of characters as a spell-corrected version of the first sequence of characters. In some aspects, the one or more processors are further configured to use the handwriting model to modify the predetermined portion of the plurality of elements of the style vector to generate the masked style vector. In some aspects, the one or more processors are configured to modify the predetermined portion of the plurality of elements of the style vector to generate the masked style vector by deleting a predetermined selection of one or more of the plurality of elements of the style vector to generate the masked style vector. In some aspects, the one or more processors are configured to modify the predetermined portion of the plurality of elements of the style vector to generate the masked style vector by assigning a predetermined value to a predetermined selection of one or more of the plurality of elements of the style vector to generate the masked style vector. In some aspects, the one or more processors being configured to generate the modified handwriting sample based on at least the masked style vector and the modified label comprises using the handwriting model to: (1) generate, based on at least the masked style vector and the modified label: a first location prediction indicating one or more predicted locations of a first point of the modified handwriting sample; a first end-of-stroke prediction representing whether the first point is predicted to be an end of a stroke within the modified handwriting sample; and a first end-of-sample prediction representing whether the first point is predicted to be a last point of the modified handwriting sample; and (2) generate, based on at least the masked style vector, the modified label, the first location prediction, the first end-of-stroke prediction, and the first end-of-sample prediction: a second location prediction indicating one or more predicted locations of a second point of the modified handwriting sample; a second end-of-stroke prediction representing whether the second point is predicted to be an end of a stroke within the modified handwriting sample; and a second end-of-sample prediction representing whether the first point is predicted to be a last point of the modified handwriting sample.

BRIEF DESCRIPTION OF THE DRAWINGS

FIG. 8 sets forth an exemplary method for using a handwriting model to generate a modified handwriting sample, in accordance with aspects of the disclosure.

FIG. 9 sets forth an exemplary method for iteratively generating a handwriting sample based on a masked style vector and a label, in accordance with aspects of the disclosure.

DETAILED DESCRIPTION

The present technology will now be described with respect to the following exemplary systems and methods. Reference numbers in common between the figures depicted and described below are meant to identify the same features.

Example Systems

Figure 1:
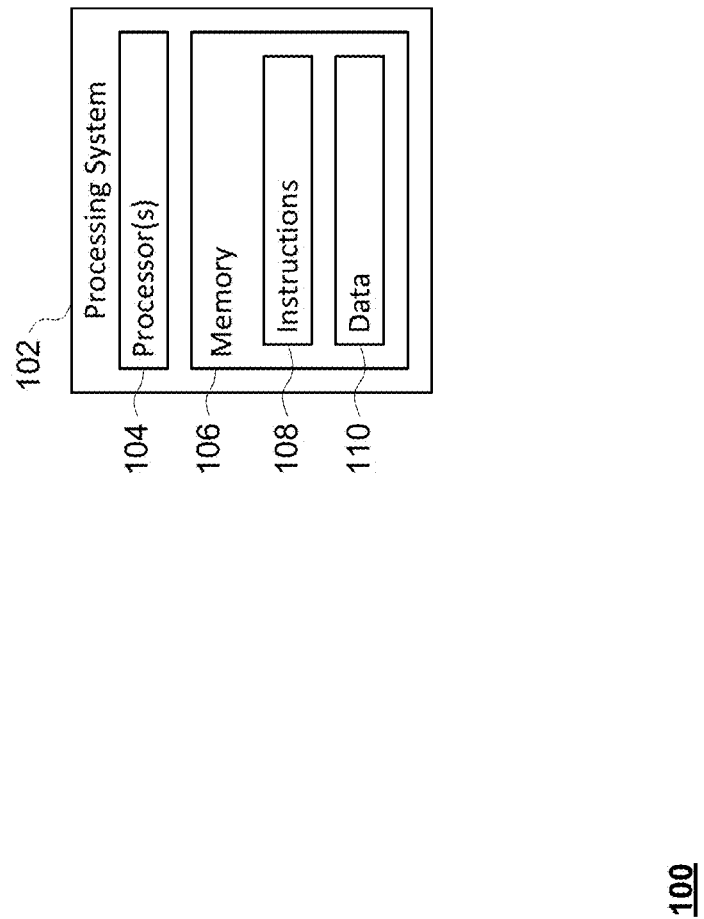
FIG. 1 is a functional diagram of an example system in accordance with aspects of the disclosure.

FIG. 1 shows a high-level system diagram 100 of an exemplary processing system 102 for performing the methods described herein. The processing system 102 may include one or more processors 104 and memory 106 storing instructions 108 and data 110. The instructions 108 and data 110 may include a handwriting model, as described further below. In addition, the data 110 may store training examples to be used in training the handwriting model (e.g., those used in pre-training or fine-tuning), training signals and/or loss values generated during training, original handwriting samples to be converted, modified labels incorporating changes to be made to the original handwriting samples, and/or modified handwriting samples generated by the handwriting model. Further, in some aspects of the technology, the instructions 108 and data 110 may also include other utilities for processing the original handwriting sample, such as one or more handwriting recognition utilities configured to recognize text in an original handwriting sample, one or more spell-correction utilities configured to generate suggested alternative spellings based on the text of the original handwriting sample, one or more grammar-correction utilities configured to generate suggested alternative words based on the text of the original handwriting sample, one or more autocorrect utilities configured to generate suggested endings to words or sentences within the text of the original handwriting sample, etc.

Processing system 102 may be resident on a single computing device. For example, processing system 102 may be a server, personal computer, or mobile device, and the handwriting model may thus be local to that single computing device. Similarly, processing system 102 may be resident on a cloud computing system or other distributed system. In such a case, the handwriting model may be distributed across two or more different physical computing devices. For example, the processing system may comprise a first computing device storing layers 1-$n$ of a handwriting model having m layers, and a second computing device storing layers n-m of the handwriting model. In such cases, the first computing device may be one with less memory and/or processing power (e.g., a personal computer, mobile phone, tablet, etc.) compared to that of the second computing device. Likewise, in some aspects of the technology, data used by the handwriting model (e.g., training data, handwriting samples and labels used during inference, etc.) may be stored on a different computing device than the handwriting model.

Figure 2:
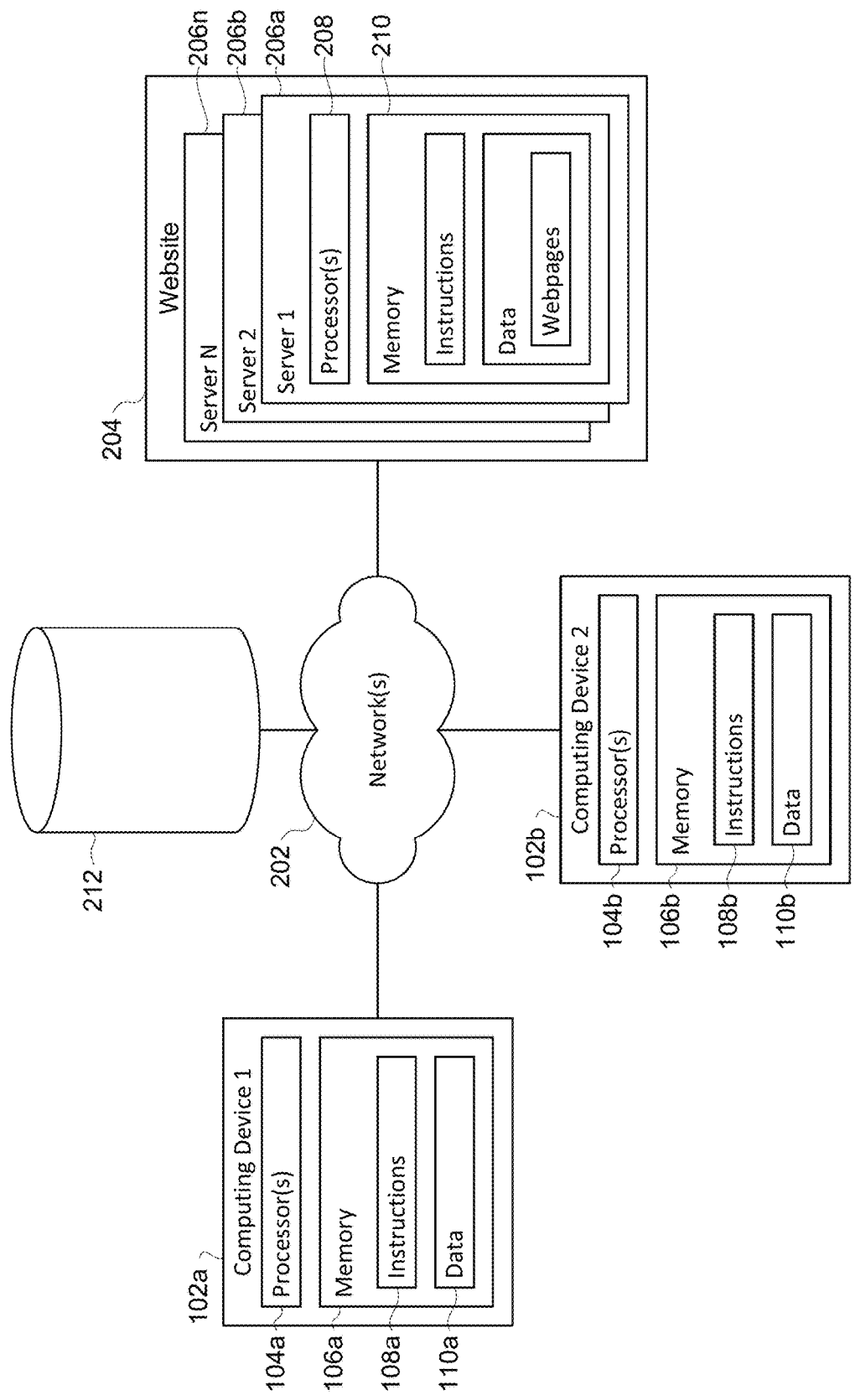
FIG. 2 is a functional diagram of an example system in accordance with aspects of the disclosure.

Further in this regard, FIG. 2 shows a high-level system diagram 200 in which the exemplary processing system 102 just described is distributed across two computing devices 102a and 102b, each of which may include one or more processors (104a, 104b) and memory (106a, 106b) storing instructions (108a, 108b) and data (110a, 110b). The processing system 102 comprising computing devices 102a and 102b is shown being in communication with one or more websites and/or remote storage systems over one or more networks 202, including website 204 and remote storage system 212. In this example, website 204 includes one or more servers 206a-206n. Each of the servers 206a-206n may have one or more processors (e.g., 208), and associated memory (e.g., 210) storing instructions and data, including the content of one or more webpages. Likewise, although not shown, remote storage system 212 may also include one or more processors and memory storing instructions and data. In some aspects of the technology, the processing system 102 comprising computing devices 102a and 102b may be configured to retrieve data from one or more of website 204 and/or remote storage system 212, for use in training the handwriting model. For example, in some aspects, the first computing device 102a may be configured to retrieve training examples from the remote storage system 212 for use in pre-training or fine-tuning of a handwriting model housed on the first computing device 102a. In some aspects of the technology, the first computing device 102a may also be further configured to retrieve labels corresponding to the text of an original handwriting sample, modified labels corresponding to a spell-corrected or grammar-corrected or autocompleted version of the text of the original handwriting sample, and/or data regarding how closely a generated handwriting sample matches the original handwriting sample (e.g., as may be used in generating loss values during training) from the second computing device 102b for use in training and/or performing inference on the handwriting model.

The processing systems described herein may be implemented on any type of computing device(s), such as any type of general computing device, server, or set thereof, and may further include other components typically present in general purpose computing devices or servers. Likewise, the memory of such processing systems may be of any non-transitory type capable of storing information accessible by the processor(s) of the processing systems. For instance, the memory may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, stylus, touch screen, and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Figure 3:
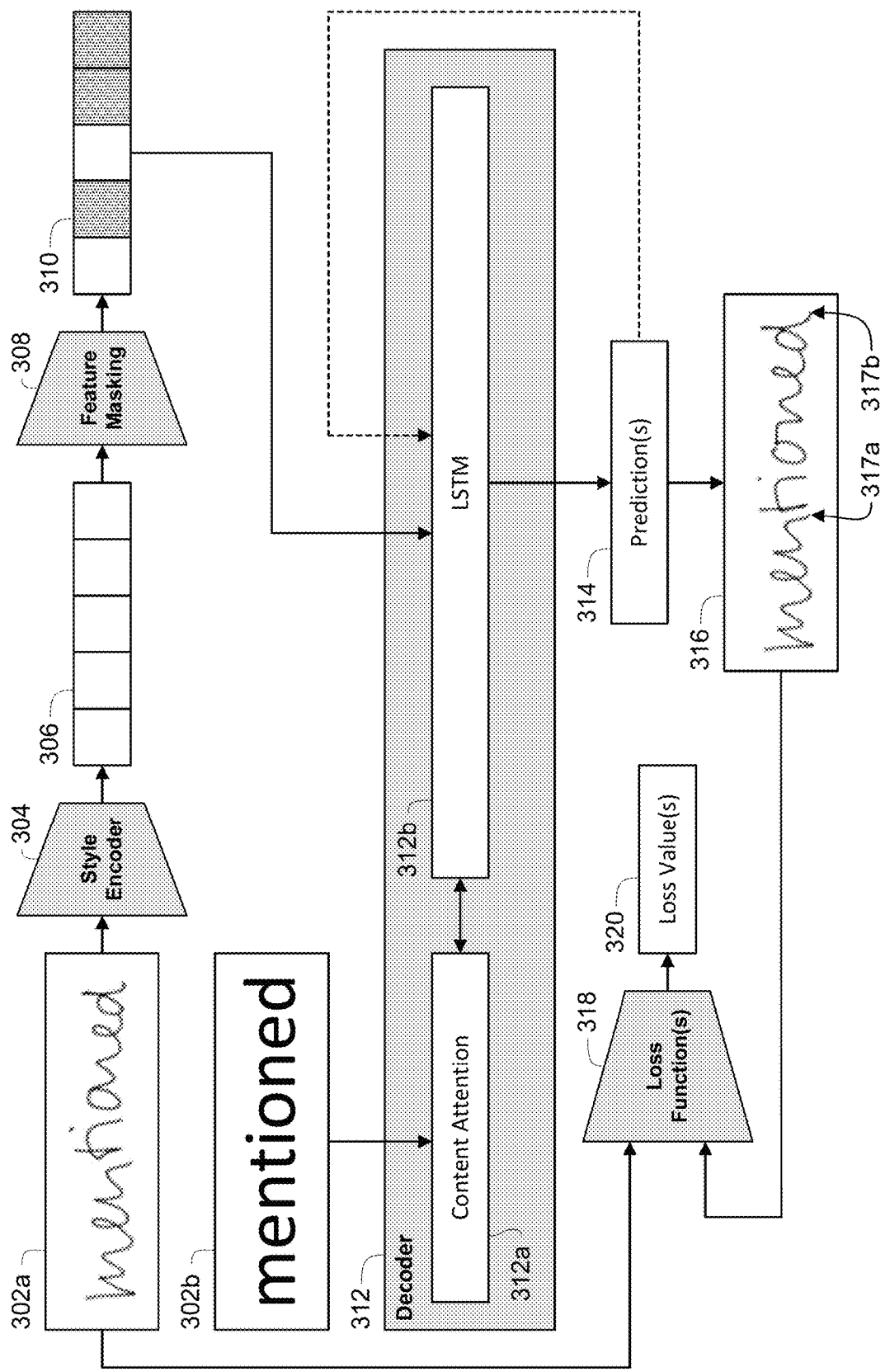
FIG. 3 is a flow diagram illustrating how an exemplary handwriting model may be trained, in accordance with aspects of the disclosure.

FIG. 3 is a flow diagram 300 illustrating how an exemplary handwriting model may be trained, in accordance with aspects of the disclosure. In that regard, FIG. 3 depicts an exemplary original handwriting sample 302a and an associated original label 302b indicating the sequence of characters (in this case, "mentioned") that are represented in the original handwriting sample 302a. Together, the original handwriting sample 302a and the original label 302b may form a training example.

The original handwriting sample 302a and the original label 302b may come from any suitable source or combination of sources. For example, in some aspects of the technology, an original label 302b may be selected from a list of words (e.g., a curated list of training words, a random selection from a dictionary, book, or webpage, etc.) and provided to a human writer who is tasked with writing the word shown in the original label 302b in order to generate the original handwriting sample 302a. Similarly, in some aspects of the technology, a pre-existing original handwriting sample 302a (e.g., a sample scanned from pre-existing handwritten letters, notes, etc.) may be reviewed by a human annotator tasked with identifying the characters represented in the original handwriting sample 302a to generate the original label 302b. Further, in some aspects of the technology, a pre-existing original handwriting sample 302a may be processed by a handwriting recognition utility (e.g., handwriting recognition utility 504 of FIG. described further below) that is configured to automatically identify the characters represented in the original handwriting sample 302a and include them in an original label 302b. Where a handwriting recognition utility is used, it may be a part of the handwriting model or may be a separate utility. Likewise, in some aspects of the technology, an original label 302b may be provided to a separate handwriting generation model in order to generate the original handwriting sample 302a.

In the example of FIG. 3, the original handwriting sample 302a is processed by a style encoder 304 to generate a style vector 306. The style encoder 304 may be any suitable heuristic-based or learned model. For example, in some aspects of the technology, the style encoder 304 may be a learned model based on any suitable architecture, e.g., a two-layer LSTM model, a transformer, etc. Further in that regard, the style encoder 304 may be a part of the handwriting model or may be a separate model. Similarly, the style vector 306 may be a vector of any suitable dimension representing any suitable number of different features. In that regard, although the style vector 306 of FIG. 3 is depicted solely for purposes of illustration as having five elements, the style encoder 304 may be configured to generate a style vector 306 that has a greater or smaller number of elements.

As shown in FIG. 3, the style vector 306 is modified by a feature masking utility 308 to generate a masked style vector 310. In the example of FIG. 3, the feature masking utility 308 is configured to modify a random selection of one or more elements of the style vector 306. In that regard, the feature masking utility 308 may be configured to randomly select a predetermined number of elements to be masked, or may be configured to randomly select a random number of elements to be masked. Further, the feature masking utility 308 may be configured to mask the randomly selected elements in any suitable way. Thus, in some aspects of the technology, the feature masking utility 308 may be configured to delete each of the randomly selected elements from the style vector 306 in order to generate the masked style vector 310. Likewise, in some aspects of the technology, the feature masking utility 308 may be configured to assign a randomly selected or predetermined value (e.g., 0, 0.5, 1, etc.) to each of the randomly selected elements from the style vector 306 in order to generate the masked style vector 310. Further, the feature masking utility 308 may be a part of the handwriting model or may be a separate utility. In addition, in some aspects, the feature masking utility 308 may be a part of the style encoder 304. For purposes of illustration, it is assumed in FIG. 3 that the feature masking utility 308 ends up masking three elements (shown as shaded boxes), leaving two elements unmasked (shown as unshaded boxes).

Once generated, the masked style vector 310 is provided to the handwriting model's decoder 312. Decoder 312 is configured to generate one or more predictions 314 based on at least the masked style vector 310 and the original label 302b, culminating in a predicted handwriting sample 316. The decoder 312 may have any suitable architecture and number of parameters. For example, as assumed in the example of FIG. 3, the decoder 312 may be a multi-layer LSTM 312b with monotonic content attention 312a. In such a case, the LSTM 312b of decoder 312 may be configured to process the masked style vector 310 with monotonic content attention over the original label 302b, and to output one or more predictions 314.

The one or more predictions 314 generated by the decoder 312 may be in any suitable form. Thus, in some aspects of the technology, the one or more predictions 314 may simply be a single predicted handwriting sample 316 output from the decoder 312, or a distribution (e.g., a Gaussian Mixture Model ("GMM") distribution) representing two or more possible predicted handwriting samples generated by the decoder 312. Likewise, in some aspects, the one or more predictions 314 may include a single point or a GMM distribution representing two or more potential locations for a point of the predicted handwriting sample 316. Further, in some aspects, the one or more predictions 314 may include the parameters of a parametric curve (e.g., a cubic Bezier curve) or a GMM distribution representing parameters of two or more potential parametric curves that may be used to generate one or more points of the predicted handwriting sample 316.

Where the one or more predictions 314 include a given point of the predicted handwriting sample 316, a GMM distribution representing two or more potential locations for a given point of the predicted handwriting sample 316, the parameters of a parametric curve (e.g., a cubic Bezier curve) that ends at a given point of the predicted handwriting sample 316, or a GMM distribution representing parameters of two or more potential parametric curves that end at a given point of the predicted handwriting sample 316, the one or more predictions 314 may further include predictions of whether that given point is predicted to be an end of a stroke of the predicted handwriting sample 316 (e.g., similar to point 317a of predicted handwriting sample 316) and/or whether that given point is predicted to be the last point of the predicted handwriting sample (e.g., similar to point 317b of predicted handwriting sample 316). In addition, where the one or more predictions 314 include a point of the predicted handwriting sample 316, a GMM distribution representing two or more potential locations for a point of the predicted handwriting sample 316, the parameters of a parametric curve (e.g., a cubic Bezier curve) of the predicted handwriting sample 316, and/or a GMM distribution representing parameters of a parametric curve of the predicted handwriting sample 316, each set of one or more predictions 314 may be fed back into the decoder 312 (as shown by the dashed line between box 314 and 312b) in order to iteratively generate predictions of the parameters of each next point and/or curve of the handwriting sample 316. For example, each set of predictions 314 may be iteratively generated and fed back into the decoder 312 according to the exemplary method 900 of FIG. 9, described further below.

In the example of FIG. 3, once the full predicted handwriting sample 316 has been generated by the decoder 312, the processing system (e.g., processing system 102) will compare the predicted handwriting sample 316 to the original handwriting sample 302a using one or more loss functions 318 configured to generate one or more loss values 320. Although the example of FIG. 3 assumes that the comparisons made by the loss functions 318 will take place after the decoder 312 generates a full predicted handwriting sample 316, in some aspects of the technology, the processing system may be configured to make these comparisons as each individual set of predictions 314 is generated. In either case, the loss values 320 generated for each training example may be used (separately, or in some aggregated form) to modify one or more parameters of the handwriting model as described further below with respect to method 700 of FIG. 7. Likewise, where the style encoder 304 is not included in the handwriting model, the loss values 320 generated for each training example may also be used (separately, or in some aggregated form) to modify one or more parameters of the style encoder 304.

The processing system may use any suitable loss function(s) 318 for generating the one or more loss values 320. For example, in some aspects of the technology, the processing system may be configured to compare the location of each point of the original handwriting sample 302a to the location of each point of the predicted handwriting sample 316. Likewise, in some aspects, the processing system may be configured to generate a negative log likelihood based on the location of each point of the original handwriting sample 302a and GMM distributions representing potential locations of each point of the predicted handwriting sample 316. Similarly, in some aspects, the processing system may be configured to generate a negative log likelihood based on the curves that make up the original handwriting sample 302a and GMM distributions representing each curve (e.g., cubic Bezier curves) of the predicted handwriting sample 316. Further, in some aspects, the processing system may be configured to generate a negative log likelihood based on: whether each point of the original handwriting sample 302a is the end of a stroke and/or the end of the sample; and a distribution (e.g., a Bernoulli distribution) representing the decoder's predictions regarding whether each point of the predicted handwriting sample 316 is the end of a stroke and/or the end of the sample.

Figure 4:
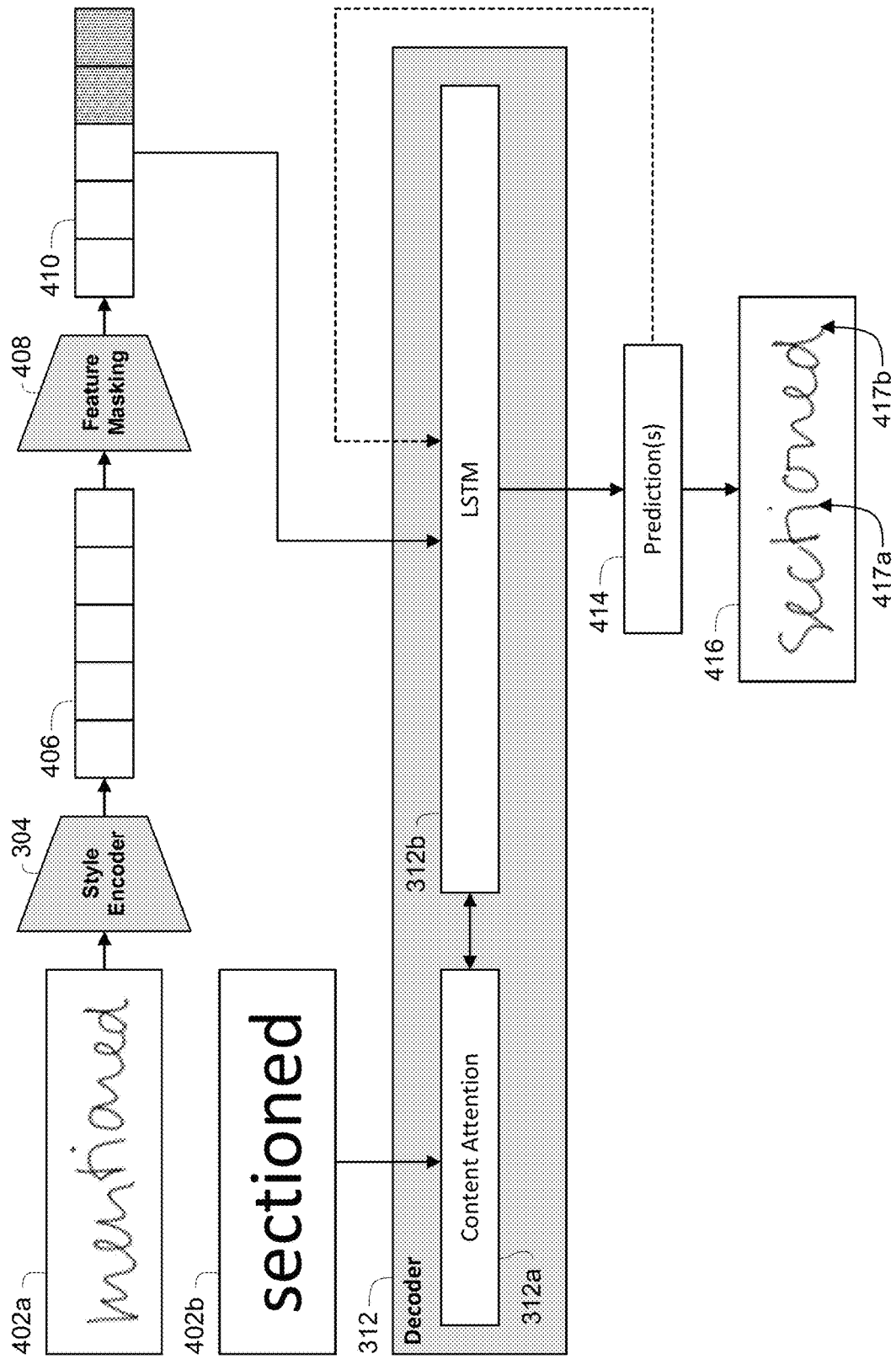
FIG. 4 is a flow diagram illustrating how an exemplary handwriting model may be used to perform inference, in accordance with aspects of the disclosure.

FIG. 4 is a flow diagram 400 illustrating how an exemplary handwriting model may be used to perform inference, in accordance with aspects of the disclosure. In that regard, FIG. 4 depicts an exemplary original handwriting sample 402a representing a first sequence of characters (in this case, "mentioned") and a modified label 402b indicating a second sequence of characters that differs from the first sequence of characters by at least one character (in this case, "sectioned").

The modified label 402b may include any suitable modification of the first sequence of characters, such as a spell-corrected, grammar-corrected, or autocompleted version of the first sequence of characters represented in the original handwriting sample 402a. Here as well, the original handwriting sample 402a may come from any suitable source or combination of sources, and may be human-generated or generated by a separate handwriting generation model as discussed above with respect to FIG. 3. Similarly, the modified label 402b may come from any suitable source. For example, in some aspects of the technology, the modified label 402b may be generated by a human annotator who reviews the original handwriting sample 402a and makes one or more additions, deletions, or substitutions to the characters represented in the original handwriting sample 402a. Likewise, in some aspects of the technology, the original handwriting sample 402a may be processed by a handwriting recognition utility (e.g., handwriting recognition utility 504 of FIG. 5A, described further below) that is configured to automatically identify the characters represented in the original handwriting sample 402a, and those characters may then be further modified by a text modification utility (e.g., text modification utility 506 of FIG. 5A, described further below) to generate the modified label 402b. Where a handwriting recognition utility and/or a text modification utility are used, either or both utilities may be a part of the handwriting model or may be separate utilities.

In the example of FIG. 4, it is assumed that the original handwriting sample 402a will be processed by the same style encoder 304 as described above with respect to FIG. 3 in order to generate a style vector 406. Here as well, the style vector 406 may be a vector of any suitable dimension representing any suitable number of different features. In that regard, although the style vector 406 of FIG. 4 is depicted solely for purposes of illustration as having five elements, the style encoder 304 may be configured to generate a style vector 406 that has a greater or smaller number of elements.

As shown in FIG. 4, the style vector 406 is modified by a feature masking utility 408 to generate a masked style vector 410. In the example of FIG. 4, the feature masking utility 408 is configured to modify a predetermined portion of the elements of the style vector 406. In that regard, the feature masking utility 408 may be configured to select any suitable predetermined portion of elements. For example, in some aspects of the technology, the feature masking utility 408 may be configured to modify the first n elements of the style vector, the last n elements of the style vector, and/or any other sequence of n elements of the style vector. Likewise, in some aspects of the technology, the feature masking utility 408 may be configured to modify a predetermined set of n elements that are not sequential, e.g., every other element of the style vector or some portion thereof, every third element of the style vector or some portion thereof, a random selection of n elements, etc. Further, the feature masking utility 408 may be configured to mask the selected elements in any suitable way. Thus, in some aspects of the technology, the feature masking utility 408 may be configured to delete each of the selected elements from the style vector 406 in order to generate the masked style vector 410. Likewise, in some aspects of the technology, the feature masking utility 408 may be configured to assign a randomly selected or predetermined value (e.g., 0, 0.5, 1, etc.) to each of the selected elements from the style vector 406 in order to generate the masked style vector 410. Further, in some aspects of the technology, the feature masking utility 407 may be configured to change the value of each selected element by some predetermined or randomly selected percentage. Here as well, the feature masking utility 408 may be a part of the handwriting model or may be a separate utility. In addition, in some aspects, the feature masking utility 408 may be a part of the style encoder 304. For purposes of illustration, it is assumed in FIG. 4 that the feature masking utility 408 ends up masking the last two elements of the style vector 406 (shown as shaded boxes), leaving the first three elements unmasked (shown as unshaded boxes).

Once generated, the masked style vector 410 is provided to the handwriting model's decoder 312. In the example of FIG. 4, decoder 312 is configured to generate one or more predictions 414 based on at least the masked style vector 410 and the modified label 402b, culminating in a modified handwriting sample 416. Here as well, the decoder 312 may have any suitable architecture and number of parameters. Thus, as assumed in the example of FIG. 4, the handwriting model may use the same decoder 312 as described above with respect to FIG. 3, having a multi-layer LSTM 312b with monotonic content attention 312a. In such a case, the LSTM 312b of decoder 312 may be configured to process the masked style vector 410 with monotonic content attention over the modified label 402b, and to output one or more predictions 414. Likewise, the decoder 312 may have been trained in any suitable way, including that described above with respect to flow diagram 300 of FIG. 3, and as described below with respect to method 700 of FIG. 7.

Here as well, the one or more predictions 414 generated by the decoder 312 may be in any suitable form. Thus, in some aspects of the technology, the one or more predictions 314 may simply be a single modified handwriting sample 416 output from the decoder 312, or a distribution (e.g., a GMM distribution) representing two or more possible modified handwriting samples generated by the decoder 312. Likewise, in some aspects, the one or more predictions 414 may include a single point or a GMM distribution representing a point of the modified handwriting sample 416. Further, in some aspects, the one or more predictions 414 may include the parameters of a parametric curve (e.g., a cubic Bezier curve) or a GMM distribution representing parameters of two or more potential parametric curves that may be used to generate one or more points of the modified handwriting sample 416.

As described above, where the one or more predictions 414 include a given point of the modified handwriting sample 416, a GMM distribution representing two or more potential locations for a given point of the modified handwriting sample 416, the parameters of a parametric curve (e.g., a cubic Bezier curve) that ends at a given point of the modified handwriting sample 416, or a GMM distribution representing parameters of two or more potential parametric curves that end at a given point of the modified handwriting sample 416, the one or more predictions 414 may further include predictions of whether that given point is predicted to be an end of a stroke of the modified handwriting sample 416 (e.g., similar to point 417a of modified handwriting sample 416) and/or whether that given point is predicted to be the last point of the modified handwriting sample (e.g., similar to point 417b of modified handwriting sample 416). In addition, where the one or more predictions 414 include a point of the modified handwriting sample 416, a GMM distribution representing two or more potential locations for a point of the modified handwriting sample 416, the parameters of a parametric curve (e.g., a cubic Bezier curve) of the modified handwriting sample 416, and/or a GMM distribution representing parameters of a parametric curve of the modified handwriting sample 416, each set of one or more predictions 414 may be fed back into the decoder 312 (as shown by the dashed line between box 414 and 312b) in order to iteratively generate predictions of the parameters of each next point and/or next curve of the modified handwriting sample 416. For example, each set of predictions 414 may be iteratively generated and fed back into the decoder 312 according to the exemplary method 900 of FIG. 9, described further below.

Figure 5A:
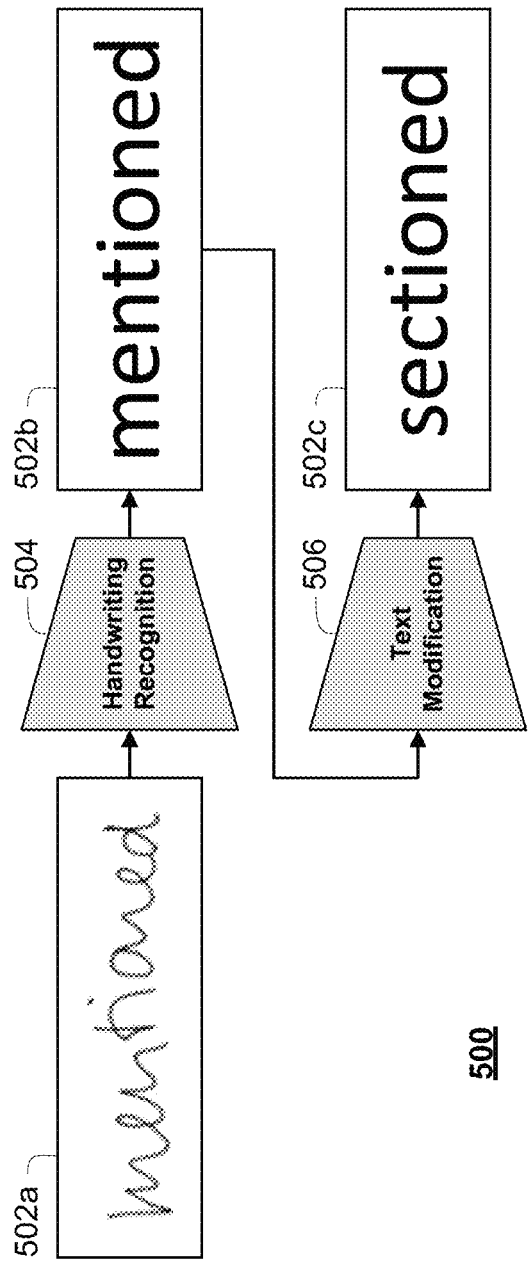
FIG. 5A is a flow diagram illustrating how an exemplary original handwriting sample may be processed to produce a modified label, in accordance with aspects of the disclosure.

FIG. 5A is a flow diagram 500 illustrating how an exemplary original handwriting sample 502a may be processed to produce a modified label 502c, in accordance with aspects of the disclosure. In that regard, in the example of FIG. 5A, an exemplary original handwriting sample 502a is processed by a handwriting recognition utility 504 that is configured to automatically identify the characters represented in the original handwriting sample 502a (in this case, "mentioned") and include them in an original label 502b. The handwriting recognition utility 504 may be any suitable type of utility configured to recognize characters in a given sample of handwriting, such as a heuristic-based or learned handwriting recognition model. Further, the handwriting recognition utility 504 may be a part of a handwriting model (e.g., the handwriting models described above with respect to FIGS. 3 and 4, and/or those described below with respect to FIGS. 7-9) or may be a separate utility.

As shown in FIG. 5A, the original label 502b is further processed by a text modification utility 506 to generate a modified label 502c. The text modification utility 506 may be any utility configured to process at least the original label 502b and generate a modified label based thereon. Thus, in some aspects of the technology, the text modification utility 506 may be a heuristic-based or learned spell-correction model that is configured to predict whether the original label 502b contains a spelling error and to generate a modified label 502c that would correct the spelling error. Likewise, in some aspects of the technology, the text modification utility 506 may be a heuristic-based or learned grammar-correction model that is configured to predict based on the original label 502b (and/or surrounding text) whether the original label 502b is not grammatically correct (e.g., wrong verb tense, wrong word, etc.), and to generate a modified label 502c that would correct the grammatical error. Further, in some aspects of the technology, the text modification utility 506 may be a heuristic-based or learned autocompletion model that is configured to predict based on the original label 502b (and/or preceding text) a modified label 502c that includes one or more additional characters or words that follow the characters of the original label 502b. In addition, in some cases, the text modification utility 506 may be further configured to solicit input from a user and base the modified label on that input (e.g., by presenting the user with a choice of multiple spelling corrections, grammar corrections, or autocomplete options, and generating a modified label from the user's selection). In the example of FIG. 5A, it is assumed that the text modification utility 506 is a grammar-correction utility that has identified a modified label 502c having the characters "sectioned." As can be seen, this results in a modified label 502c having a string of characters that differs from the sequence of characters in the original label 502b by three characters (in this case, "sec" is substituted for "men").

Figure 5B:
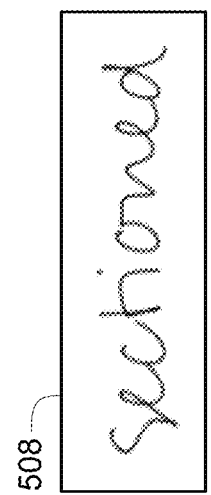
FIG. 5B illustrates an exemplary modified handwriting sample generated based on the original handwriting sample and the modified label of FIG. 5A, in accordance with aspects of the disclosure.

FIG. 5B illustrates an exemplary modified handwriting sample 508 generated based on the original handwriting sample 502a and the modified label 502c of FIG. 5A, in accordance with aspects of the disclosure. As can be seen in this exemplary illustration, the modified handwriting sample 508 represents the text of the modified label 502c, yet otherwise remains visually and stylistically consistent with the original handwriting sample 502a. In that regard, although there are characters in common between the modified handwriting sample 508 and the original handwriting sample 502a (in this case, the characters "tioned"), those characters are visually and stylistically consistent in both samples without be identical copies of one another. This characteristic may be designed into the handwriting model by, for example, training the handwriting model to generate handwriting samples similar to an original handwriting sample, but to do so based only on a masked style vector and an original label (e.g., as described above with respect to FIG. 3, and below with respect to FIG. 7). In such a case, random masking of the style vector during training may be used to ensure that the model does not learn to simply "memorize" each original handwriting sample through its style encoder by generating a style vector that is effectively a translation of the original handwriting sample. Further, in some aspects of the technology, the amount of similarity between the original handwriting sample 502a and the modified handwriting sample 508 may be further tuned by controlling the extent to which the style vector is masked during inference. In that regard, by determining how many elements of the style vector are to be masked during inference and/or in what way they are to be masked (e.g., as described above with respect to FIG. 4, and below with respect to FIG. 8), it is possible to limit how much of the style vector will be used in generating the modified handwriting sample, and thus control how much stylistic similarity there will be between an original handwriting sample and the resulting modified handwriting sample. In such a case, a similarity value may be specified in advance to determine what portion of the style vector's elements will remain unmasked (e.g., a similarity value of 1 may be used to indicate that 100% of the style vector's elements are to remain unmasked, while a similarity value of 0.4 may be used to indicate that only 40% of the style vector's elements are to remain unmasked). Further, where the processing system and/or the handwriting model is configured to mask selected elements of the style vector in a proportional fashion (as discussed above), a modification value may also be specified in advance to determine the amount by which each selected element will be modified (e.g., a modification value of 0.5 may be used to indicate that the value of each selected element should be increased or decreased by 50%).

Figure 6A:
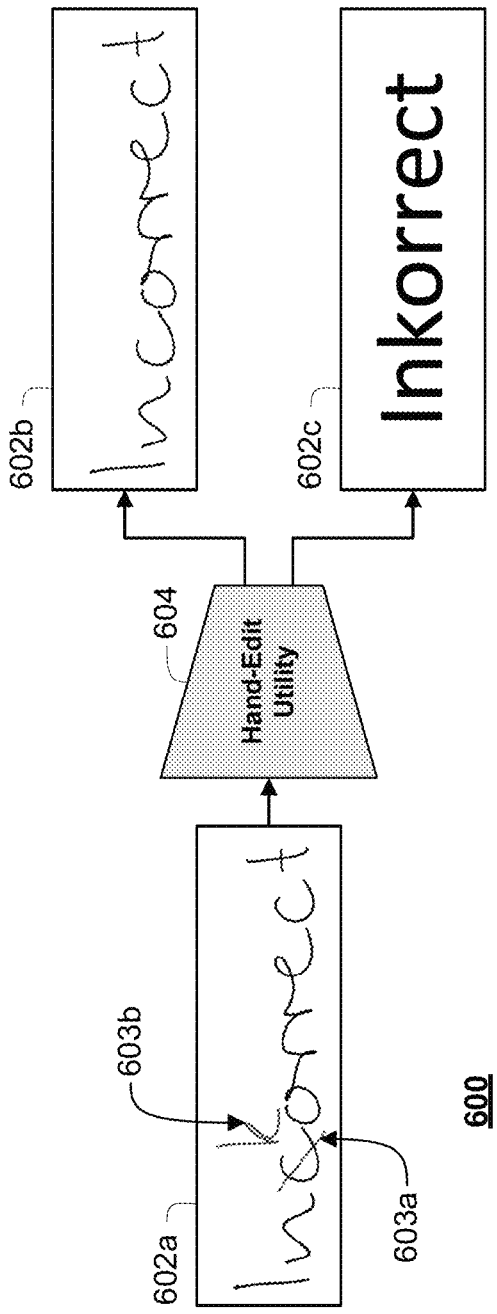
FIG. 6A is a flow diagram illustrating how a hand-edited handwriting sample may be processed to produce an original handwriting sample and a modified label, in accordance with aspects of the disclosure.

FIG. 6A is a flow diagram illustrating how a hand-edited handwriting sample 602a may be processed to produce an original handwriting sample 602b and a modified label 602c, in accordance with aspects of the disclosure. In that regard, in the example of FIG. 6A, a hand-edited handwriting sample 602a includes hand-edits 603a and 603b. In particular, the hand-edited handwriting sample 602a includes a cross-out 603a and an additional letter 603b written in above it to indicate that the letter "c" should be deleted and replaced with a "k." These exemplary hand-edits may be generated in any suitable way. For example, a device (e.g., a personal computer, mobile phone, tablet, etc.) may be configured to enable a user to generate handwriting (e.g., using a finger or a stylus on a touch sensor), and to further indicate edits to that handwriting using the same writing implement. Likewise, in some aspects of the technology, the hand-edited handwriting sample 602a (and the hand-edits 603a and 603b) may be a copy of handwriting that was originally applied to paper and then subsequently converted into digital form (e.g., using a camera or scanner).

As shown in FIG. 6A, the handwriting sample 602a and the hand-edits 603a and 603b are processed by a hand-edit utility 604 that is configured to automatically: (1) identify what within the hand-edited handwriting sample 602a constitutes the original handwriting and include it within an original handwriting sample 602b; (2) identify what within the hand-edited handwriting sample 602a constitutes the hand-edits; and (3) generate a modified label 602c based on the hand-edited handwriting sample 602a. The hand-edit utility 604 may also be configured to carry out these tasks in any suitable way, and/or with any suitable number of intermediate steps. For example, in some aspects of the technology, the hand-edit utility 604 may be configured to process the generated original handwriting sample 602b to generate an original label (not shown), and may be further configured to process the hand-edits 602a and 602b to determine how to modify the original label in order to generate the modified label 602c. In this example, the hand-edit utility 604 processes the hand-edited handwriting sample 602a to generate an original handwriting sample 602b in which the hand-edits 603a and 603b have been removed from the hand-edited handwriting sample 602a, and a modified label representing the intended text of the hand-edited handwriting sample 602a (in this case, "Inkorrect").

The hand-edit utility 604 may be any suitable type of utility (or combination of utilities) configured to perform these tasks in any suitable way, such as a heuristic-based or learned model. Further, the hand-edit utility 604 may be a single utility, or a combination of separate utilities. For example, in some aspects of the technology, the hand-edit utility 604 may include a first utility configured to recognize the text contained within the hand-edited handwriting sample 602a, a second utility configured to recognize the intent of the hand-edits 603a and 603b, and a third utility configured to generate a modified label 602c based on the outputs of the first and second utilities. Here as well, the hand-edit utility 604 may be a part of a handwriting model (e.g., the handwriting models described above with respect to FIGS. 3 and 4, and/or those described below with respect to FIGS. 7-9) or may be a separate utility.

Figure 6B:
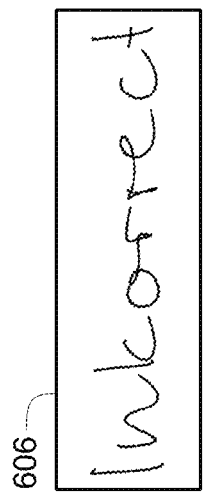
FIG. 6B illustrates an exemplary modified handwriting sample generated based on the original handwriting sample and the modified label of FIG. 6A, in accordance with aspects of the disclosure.

FIG. 6B illustrates an exemplary modified handwriting sample 606 generated based on the original handwriting sample 602b and the modified label 602c of FIG. 6A, in accordance with aspects of the disclosure. Here as well, in this exemplary illustration, the modified handwriting sample 606 represents the text of the modified label 602c, yet otherwise remains visually and stylistically consistent with the original handwriting sample 602b. In that regard, although there are characters in common between the modified handwriting sample 606 and the original handwriting sample 602b (in this case, the characters "In" and "orrect"), those characters are visually and stylistically consistent in both samples without be identical copies of one another.

Figure 7:
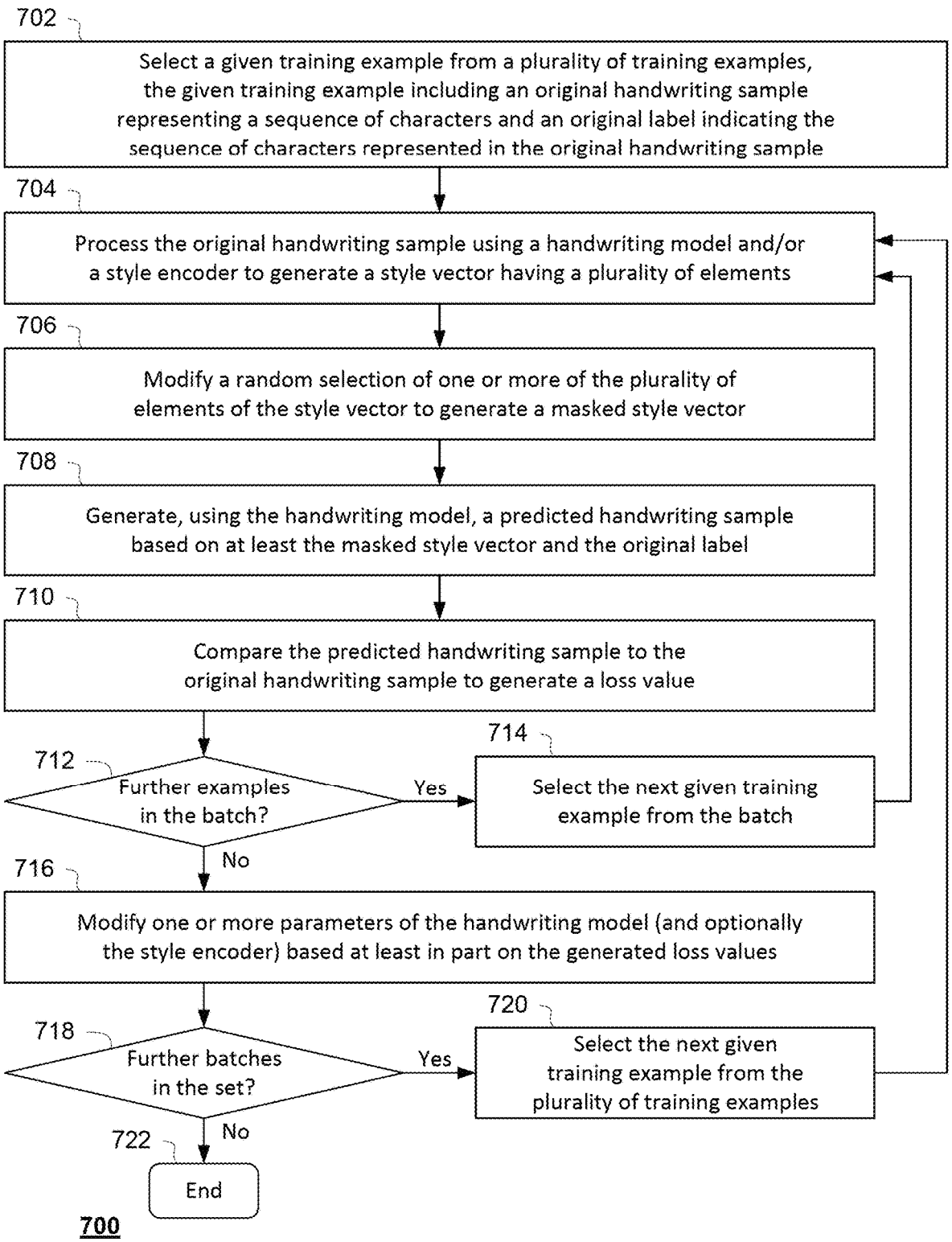
FIG. 7 sets forth an exemplary method for training a handwriting model to generate a predicted handwriting sample, in accordance with aspects of the disclosure.

FIG. 7 sets forth an exemplary method 700 for training a handwriting model (e.g., the handwriting model of FIG. 3) to generate a predicted handwriting sample, in accordance with aspects of the disclosure.

In step 702, the processing system (e.g., processing system 102 of FIG. 1 or 2) selects a given training example from a plurality of training examples, the given training example including an original handwriting sample (e.g., original handwriting sample 302a of FIG. 3) representing a sequence of characters and an original label (e.g., original label 302b of FIG. 3) indicating the sequence of characters represented in the original handwriting sample. The plurality of training examples may be from any suitable source or collection of sources. For example, the plurality of training examples may include examples from existing databases of training data, human-generated handwriting samples with human-generated labels, human-generated handwriting samples with synthetically generated labels (e.g., labels generated by a handwriting recognition utility as described above with respect to FIG. 5A), synthetically generated handwriting samples (e.g., handwriting samples generated by an existing heuristic-based or learned handwriting model) with labels indicating the characters used to generate the handwriting samples, and/or synthetically generated handwriting samples with human-generated labels.

In step 704, the processing system processes the original handwriting sample to generate a style vector (e.g., style vector 306 of FIG. 3) having a plurality of elements. The processing system may do this using a style encoder (e.g., style encoder 304 of FIG. 3) that is a part of a handwriting model or a separate utility. As described above with respect to FIG. 3, the style encoder may be any suitable heuristic-based or learned model (e.g., a two-layer LSTM model, a transformer, etc.), and the generated style vector may be a vector of any suitable dimension representing any suitable number of different features.

In step 706, the processing system modifies a random selection of one or more of the plurality of elements of the style vector to generate a masked style vector (e.g., masked style vector 310 of FIG. 3). The processing system may do this in any suitable way, such as by using a feature masking utility (e.g., feature masking utility 308 of FIG. 3) that is a part of the handwriting model or a separate utility. Here as well, the processing system may be configured to randomly select a predetermined number of elements to be masked, or may be configured to randomly select a random number of elements to be masked. Further, the processing system may be configured to mask the randomly selected elements in any suitable way. Thus, in some aspects of the technology, the processing system may be configured to delete each of the randomly selected elements from the style vector in order to generate the masked style vector. Likewise, in some aspects of the technology, the processing system may be configured to assign a randomly selected or predetermined value (e.g., 0, 0.5, 1, etc.) to each of the randomly selected elements from the style vector in order to generate the masked style vector.

In step 708, the processing system uses the handwriting model to generate a predicted handwriting sample (e.g., predicted handwriting sample 316 of FIG. 3) based on at least the masked style vector and the original label. The processing system may do this using a handwriting model of any suitable type, architecture, and number of parameters, including any of the options described above with respect to the handwriting model and its decoder 312 of FIG. 3. Further, as described above with respect to FIG. 3, the handwriting model may be configured to directly generate the predicted handwriting sample on a single pass, or may be configured to iteratively predict successive points, curves, or portions of the predicted handwriting sample which culminate in a full predicted handwriting sample.

In step 710, the processing system compares the predicted handwriting sample to the original handwriting sample to generate a loss value (e.g., the one or more loss values 320 of FIG. 3). The processing system may make this comparison and generate a loss value in any suitable way, and at any suitable time. Thus, here as well, the processing system may be configured to make its comparison and/or generate a loss value after the handwriting model generates a full predicted handwriting sample, or after intermediate predictions (e.g., of a given point or curve of the predicted handwriting sample) are generated. The processing system may also use any suitable loss function(s) for generating a loss value. For example, in some aspects of the technology, the processing system may be configured to compare the location of each point of the original handwriting sample to the location of each point of the predicted handwriting sample. Likewise, in some aspects, the processing system may be configured to generate a negative log likelihood based on the location of each point of the original handwriting sample and a GMM distribution representing the potential locations of each point of the predicted handwriting sample. Further, in some aspects, the processing system may be configured to generate a negative log likelihood based on: whether each point of the original handwriting sample is the end of a stroke and/or the end of the sample; and a distribution (e.g., a Bernoulli distribution) representing the handwriting model's predictions regarding whether each point of the predicted handwriting sample is the end of a stroke and/or the end of the sample.

In step 712, the processing system determines if there are further training examples in the batch. In that regard, the plurality of training examples may be broken into multiple batches, or kept whole, in which case there will be one single "batch" containing every training example of the plurality of first training examples. In either case, as shown by the "yes" arrow, if the processing system determines that there are further training examples in the batch, it will proceed to step 714. In step 714, the processing system will select the next given training example from the batch, and then repeat steps 704-712 for that newly selected training example. This process will then be repeated for each next given training example of the batch until the processing system determines, at step 712, that there are no further training examples in the batch, and thus proceeds to step 716 (as shown by the "no" arrow).

As shown in step 716, after a loss value has been generated (in step 710) for every given training example in the batch, the processing system modifies one or more parameters of the handwriting model based at least in part on the generated loss values. Likewise, where the style encoder is not included in the handwriting model, the loss values generated for each training example may also be used (separately, or in some aggregated form) to modify one or more parameters of the style encoder. The processing system may be configured to modify the one or more parameters based on these generated loss values in any suitable way and at any suitable interval. For example, an optimization routine, such as stochastic gradient descent, may be applied to the generated loss values to determine parameter modifications. In some aspects of the technology, each "batch" may include a single training example such that the processing system will conduct a back-propagation step in which it modifies the one or more parameters of the handwriting model or the style encoder every time a loss value is generated. Likewise, where each "batch" includes two or more training examples, the processing system may be configured to combine the generated loss values into an aggregate loss value (e.g., by summing or averaging the multiple loss values), and modify the one or more parameters of the handwriting model or the style encoder based on that aggregate loss value.

In step 718, the processing system determines if there are further batches in the plurality of training examples. Where the plurality of training examples has not been broken up, and there is thus one single "batch" containing every training example in the plurality of training examples, the determination in step 718 will automatically be "no," and method 700 will then end as shown in step 722. However, where the plurality of training examples has been broken into two or more batches, the processing system will follow the "yes" arrow to step 720 to select the next given training example from the plurality of training examples. This will then start another set of passes through steps 704-712 for each training example in the next batch and another modification of one or more parameters of the handwriting model (and optionally the style encoder) in step 716. This process will continue until there are no further batches remaining, at which point the processing system will follow the "no" arrow to step 722.

Although method 700 is shown as ending in step 722 once all training examples of the plurality of training examples have been used to tune the parameters of the handwriting model (and optionally the style encoder), it will be understood that method 700 may be repeated any suitable number of times using the same plurality of training examples until each of its predicted handwriting samples are sufficiently close to their respective original handwriting samples in each training example. In that regard, in some aspects of the technology, the processing system may be configured to repeat method 700 for the plurality of training examples some predetermined number of times. Further, in some aspects, the processing system may be configured to aggregate all of the loss values generated during a given pass through method 700, and determine whether to repeat method 700 for the plurality of training examples based on that aggregate loss value. For example, in some aspects of the technology, the processing system may be configured to repeat method 700 for the plurality of training examples if the aggregate loss value for the most recent pass through method 700 was greater than some predetermined threshold. Likewise, in some aspects, the processing system may be configured to use gradient descent, and to thus repeat method 700 for the plurality of training examples until the aggregate loss value on a given pass through method 700 is equal to or greater than the aggregate loss value from the pass before it.

FIG. 8 sets forth an exemplary method 800 for using a handwriting model (e.g., the handwriting model of FIGS. 3, 4, and 7, above) to generate a modified handwriting sample, in accordance with aspects of the disclosure.

In step 802, the processing system (e.g., processing system 102 of FIG. 1 or 2) processes the original handwriting sample (e.g., original handwriting sample 402a of FIG. 4) to generate a style vector (e.g., style vector 406 of FIG. 4) having a plurality of elements, the original handwriting sample representing a first sequence of characters. Here as well, the processing system may do this using a style encoder (e.g., style encoder 304 of FIGS. 3 and 4) that is a part of a handwriting model or a separate utility. As described above with respect to FIGS. 3 and 4, the style encoder may be any suitable heuristic-based or learned model (e.g., a two-layer LSTM model, a transformer, etc.), and the generated style vector may be a vector of any suitable dimension representing any suitable number of different features.

In step 804, the processing system modifies a predetermined portion of the plurality of elements of the style vector to generate a masked style vector. The processing system may do this in any suitable way, such as by using a feature masking utility (e.g., feature masking utility 408 of FIG. 4) that is a part of the handwriting model or a separate utility. Here as well, the processing system may be configured to select any suitable predetermined portion of elements, such as the first n elements of the style vector, the last n elements of the style vector, and/or any other sequence of n elements of the style vector. Likewise, in some aspects of the technology, the processing system may be configured to modify a predetermined set of n elements that are not sequential, e.g., every other element of the style vector or some portion thereof, every third element of the style vector or some portion thereof, a random selection of n elements, etc. Further, the processing system may be configured to mask the selected elements in any suitable way, such as by deleting each of the selected elements from the style vector in order to generate the masked style vector, assigning a randomly selected or predetermined value (e.g., 0, 0.5, 1, etc.) to each of the selected elements from the style vector in order to generate the masked style vector, or changing the value of each selected element by some predetermined or randomly selected percentage in order to generate the masked style vector.

In step 806, the processing system uses the handwriting model to generate a modified handwriting sample (e.g., modified handwriting sample 416 of FIG. 4) based on at least the masked style vector and a modified label (e.g., modified label 402b of FIG. 4), the modified label indicating a second sequence of characters, the second sequence of characters differing from the first sequence of characters by at least one character. Here as well, the processing system may do this using a handwriting model of any suitable type, architecture, and number of parameters, including any of the options described above with respect to the handwriting model and its decoder 312 of FIGS. 3 and 4. Further, as described above with respect to FIGS. 3 and 4, the handwriting model may be configured to directly generate the modified handwriting sample on a single pass, or may be configured to iteratively predict successive points, curves, or portions of the modified handwriting sample which culminate in a full modified handwriting sample.

FIG. 9 sets forth an exemplary method 900 for iteratively generating a handwriting sample based on a masked style vector and a label, in accordance with aspects of the disclosure. In that regard, method 900 may be used to generate a predicted handwriting sample (e.g., the predicted handwriting sample 314 of FIG. 3, and/or the predicted handwriting sample of step 708 of FIG. 7) based on an original label (e.g., the original label 302b of FIG. 3, and/or the original label described in step 702 of FIG. 7). Likewise, method 900 may be used to generate a modified handwriting sample (e.g., the modified handwriting sample 414 of FIG. 4, the modified handwriting sample 508 of FIG. 5A, the modified handwriting sample 606 of FIG. 6B, and/or the modified handwriting sample of step 806 of FIG. 8) based on a modified label (e.g., the modified label 402b of FIG. 4, the modified label 502c of FIG. 5A, the modified label 602c of FIG. 6A, and/or the modified label described in step 806 of FIG. 8).

In step 902, the processing system (e.g., processing system 102 of FIG. 1 or 2) generates, based on at least a masked style vector (e.g., that of step 706 of FIG. 7 or step 802 of FIG. 8) and a label (e.g., the original label of FIG. 7 or the modified label FIG. 8): a first location prediction indicating one or more predicted locations of a first point of the handwriting sample; a first end-of-stroke prediction representing whether the first point is predicted to be an end of a stroke within the handwriting sample; and a first end-of-sample prediction representing whether the first point is predicted to be a last point of the handwriting sample.

These predictions may be in any suitable form. For example, in some aspects of the technology, the first location prediction may indicate predicted coordinates of the first point of the handwriting sample, or may be a distribution (e.g., a GMM distribution) associating probabilities with multiple different potential locations for the first point of the handwriting sample. Likewise, in some aspects of the technology, the first location prediction may indicate predicted parameters of a parametric curve (e.g., a cubic Bezier curve) that passes through the first point of the handwriting sample, or may be a distribution (e.g., a GMM distribution) associating probabilities with parameters of multiple different parametric curves (e.g., cubic Bezier curves) that pass through different potential locations for the first point of the handwriting sample.

Similarly, the first end-of-stroke prediction may represent a prediction of whether a single predicted "first point" of the handwriting sample is likely to be the end of a stroke (e.g., point 317a of predicted handwriting sample 316 of FIG. 3, or point 417a of modified handwriting sample 416 of FIG. 4), or may be a distribution (e.g., a Bernoulli distribution) representing for each given potential location of the first point of the handwriting sample the likelihood that the given potential location would be an end of a stroke.

Further, the first end-of-sample prediction may represent a prediction of whether a single predicted "first point" of the handwriting sample is likely to be the end of the sample (e.g., point 317b of predicted handwriting sample 316 of FIG. 3, or point 417b of modified handwriting sample 416 of FIG. 4), or may be a distribution (e.g., a Bernoulli distribution) representing for each given potential location of the first point of the handwriting sample the likelihood that the given potential location would be an end of the sample.

In step 904, the processing system generates, based on at least the masked style vector, the label, the first location prediction (generated in step 902), the first end-of-stroke prediction (generated in step 902), and the first end-of-sample prediction (generated in step 902): a second location prediction indicating one or more predicted locations of a next point of the handwriting sample; a second end-of-stroke prediction representing whether the next point is predicted to be an end of a stroke within the handwriting sample; and a second end-of-sample prediction representing whether the next point is predicted to be a last point of the handwriting sample.

These predictions may also be in any suitable form. Thus, the second location prediction may be in the same form as the first location prediction, the second end-of-stroke prediction may be in the same form as the first end-of-stroke prediction, and the second end-of-sample prediction may be in the same form as the first end-of-sample prediction.

In step 906, the processing system determines if the "next point" from the most recent pass through step 904 will be the last point of the handwriting sample. This determination may be made in any suitable way. For example, in some aspects of the technology, this determination may be based in whole or in part on the second end-of-sample prediction generated in the most recent pass through step 904.

If the "next point" from step 904 is determined to be the last point of the handwriting sample, then method 900 will end as shown by the "yes" arrow leading to step 914. However, if the "next point" from step 904 is not determined to be the last point of the handwriting sample, then the processing system will proceed to step 908 as shown by the "no" arrow.

In steps 908-912, the processing system sets the second location prediction to be the first location prediction, the second end-of-stroke prediction to be the first end-of-stroke prediction, and the second end-of-sample prediction to be the first end-of-sample prediction, respectively. As shown by the arrow connecting step 914 back to step 904, the processing system then returns to step 904 to generate a new "second location prediction," a new "second end-of-stroke prediction," and a new "second end-of-sample prediction" for the next successive point of the handwriting sample. The processing system will then make the same determination in step 906 as to this new "next point," as just described. In this way, steps 904-912 will be repeated iteratively for each next point of the handwriting sample until it is determined, at step 904, that the processing system has predicted the last point of the handwriting sample, at which point the process 900 will end as shown in step 914.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method, comprising:
    training a handwriting model, wherein the training comprises:
        for each given training example of a plurality of training examples, the given training example including an original handwriting sample representing a sequence of characters and an original label indicating the sequence of characters represented in the original handwriting sample:
            processing, using the handwriting model, the original handwriting sample to generate a style vector having a plurality of elements;
            modifying, using one or more processors of a processing system, a random selection of one or more of the plurality of elements of the style vector to generate a masked style vector;
            generating, using the handwriting model, a predicted handwriting sample based on at least the masked style vector and the original label; and
            comparing, using the one or more processors, the predicted handwriting sample to the original handwriting sample to generate a loss value for the given training example; and
        modifying, using the one or more processors, one or more parameters of the handwriting model based at least in part on the loss values generated for each of the plurality of training examples.

2. The method of claim 1, wherein the original handwriting sample comprises a digital image.

3. The method of claim 1, wherein the original handwriting sample comprises a plurality of spatial coordinates.

4. The method of claim 3, wherein each given spatial coordinate of the plurality of spatial coordinates is associated with a time value.

5. The method of claim 4, wherein each given spatial coordinate of the plurality of spatial coordinates comprises a one-dimensional coordinate for the time value.

6. The method of claim 4, wherein the time value associated with each given spatial coordinate is an absolute time value.

7. The method of claim 4, wherein the time value associated with each given spatial coordinate is a relative time value.

8. The method of claim 7, wherein the relative time value associated with each given spatial coordinate is a sequence identifier indicating a temporal order of each given spatial coordinate.

9. The method of claim 1, wherein each given spatial coordinate of the plurality of spatial coordinates comprises a two-dimensional point.

10. The method of claim 1, wherein the original handwriting sample comprises a plurality of parametric curves.

11. The method of claim 1, wherein the one or more processors use the handwriting model to modify the random selection of one or more of the plurality of elements of the style vector to generate the masked style vector.

12. The method of claim 1, wherein modifying the random selection of one or more of the plurality of elements of the style vector to generate the masked style vector comprises deleting a random selection of one or more of the plurality of elements from the style vector to generate the masked style vector.

13. The method of claim 1, wherein modifying random selection of one or more of the plurality of elements of the style vector to generate the masked style vector comprises assigning a predetermined value to random selection of one or more of the plurality of elements of the style vector to generate the masked style vector.

14. The method of claim 13, wherein the predetermined value is zero.

15. The method of claim 1, wherein generating the predicted handwriting sample based on at least the masked style vector and the original label comprises:
    generating, based on at least the masked style vector and the original label:
        a first location prediction indicating one or more predicted locations of a first point of the predicted handwriting sample;
        a first end-of-stroke prediction representing whether the first point is predicted to be an end of a stroke within the predicted handwriting sample; and
        a first end-of-sample prediction representing whether the first point is predicted to be a last point of the predicted handwriting sample; and
    generating, based on at least the masked style vector, the original label, the first location prediction, the first end-of-stroke prediction, and the first end-of-sample prediction:
        a second location prediction indicating one or more predicted locations of a second point of the predicted handwriting sample;
        a second end-of-stroke prediction representing whether the second point is predicted to be an end of a stroke within the predicted handwriting sample; and
        a second end-of-sample prediction representing whether the first point is predicted to be a last point of the predicted handwriting sample.

16. The method of claim 15, wherein the first location prediction comprises a first probability distribution associating a probability value with each of the one or more predicted locations of the first point, and the second location prediction comprises a second probability distribution associating a probability value with each of the one or more predicted locations of the second point.

17. The method of claim 15, wherein the first location prediction comprises a probability distribution associating a probability value with one or more parameters of a parametric curve ending at the first point, and the second location prediction comprises a probability distribution associating a probability value with one or more parameters of a parametric curve ending at the second point.

18. A computer-implemented method, comprising:
    processing, using a handwriting model, an original handwriting sample to generate a style vector having a plurality of elements, the original handwriting sample representing a first sequence of characters;
    modifying, using one or more processors of a processing system, a predetermined portion of the plurality of elements of the style vector to generate a masked style vector; and generating, using the handwriting model, a modified handwriting sample based on at least the masked style vector and a modified label, the modified label indicating a second sequence of characters generated based on the first sequence of characters, the second sequence of characters differing from the first sequence of characters by at least one character.

19. The method of claim 18, wherein the second sequence of characters is a spell-corrected version of the first sequence of characters.

20. The method of claim 18, wherein the one or more processors use the handwriting model to modify the predetermined portion of the plurality of elements of the style vector to generate the masked style vector.

21. The method of claim 18, wherein modifying the predetermined portion of the plurality of elements of the style vector to generate the masked style vector comprises deleting a predetermined selection of one or more of the plurality of elements of the style vector to generate the masked style vector.

22. The method of claim 18, wherein modifying the predetermined portion of the plurality of elements of the style vector to generate the masked style vector comprises assigning a predetermined value to a predetermined selection of one or more of the plurality of elements of the style vector to generate the masked style vector.

23. The method of claim 18, wherein generating the modified handwriting sample based on at least the masked style vector and the modified label comprises:
generating, based on at least the masked style vector and the modified label:
a first location prediction indicating one or more predicted locations of a first point of the modified handwriting sample;
a first end-of-stroke prediction representing whether the first point is predicted to be an end of a stroke within the modified handwriting sample; and
a first end-of-sample prediction representing whether the first point is predicted to be a last point of the modified handwriting sample; and generating, based on at least the masked style vector, the modified label, the first location prediction, the first end-of-stroke prediction, and the first end-of-sample prediction:
a second location prediction indicating one or more predicted locations of a second point of the modified handwriting sample;
a second end-of-stroke prediction representing whether the second point is predicted to be an end of a stroke within the modified handwriting sample; and
a second end-of-sample prediction representing whether the first point is predicted to be a last point of the modified handwriting sample.

24. The method of claim 18, wherein the handwriting model is a handwriting model trained according to a training method comprising:
for each given training example of a plurality of training examples, the given training example including a training handwriting sample representing a sequence of characters and a training label indicating the sequence of characters represented in the training handwriting sample:
processing, using the handwriting model, the training handwriting sample to generate a training style vector having a plurality of elements;
modifying, using the one or more processors, a random selection of one or more of the plurality of elements of the training style vector to generate a masked training style vector;
generating, using the handwriting model, a predicted handwriting sample based on at least the masked training style vector and the training label; and
comparing, using the one or more processors, the predicted handwriting sample to the training handwriting sample to generate a loss value for the given training example; and
modifying, using the one or more processors, one or more parameters of the handwriting model based at least in part on the loss values generated for each of the plurality of training examples.

* * * * *

UNITED STATES PATENT AND TRADEMARK OFFICE
CERTIFICATE OF CORRECTION

PATENT NO. : 12,008,692 B2
APPLICATION NO. : 17/831623
DATED : June 11, 2024
INVENTOR(S) : Andrii Maksai et al.

It is certified that error appears in the above-identified patent and that said Letters Patent is hereby corrected as shown below:

In the Claims

Column 23, Line 62, Claim 9:
Now reads: "of the plurality"; should read -- of a plurality --

Signed and Sealed this
Twenty-third Day of July, 2024

Katherine Kelly Vidal
*Director of the United States Patent and Trademark Office*